(12) United States Patent
Bhatia et al.

(10) Patent No.: US 12,393,486 B2
(45) Date of Patent: Aug. 19, 2025

(54) AUTOMATIC BMC AND BIOS FIRMWARE RECOVERY

(71) Applicant: American Megatrends International, LLC, Duluth, GA (US)

(72) Inventors: Anurag Bhatia, Sugar Hill, GA (US); Winston Thangapandian, Suwanee, GA (US); Valantina Arumugam, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 88 days.

(21) Appl. No.: 18/223,299

(22) Filed: Jul. 18, 2023

(65) Prior Publication Data
US 2025/0028601 A1    Jan. 23, 2025

(51) Int. Cl.
*G06F 11/14* (2006.01)
*G06F 9/4401* (2018.01)

(52) U.S. Cl.
CPC ........ *G06F 11/1417* (2013.01); *G06F 9/4401* (2013.01)

(58) Field of Classification Search
CPC .................. G06F 11/1417; G06F 9/4401
See application file for complete search history.

(56) References Cited

U.S. PATENT DOCUMENTS

| | | | |
|---|---|---|---|
| 10,776,286 B1 * | 9/2020 | Kulchytskyy | G06F 8/65 |
| 10,922,413 B2 | 2/2021 | Mihm et al. | |
| 2017/0052854 A1 * | 2/2017 | Yang | G06F 9/4401 |
| 2020/0184077 A1 * | 6/2020 | Venkataraman | G06F 21/575 |
| 2023/0086829 A1 * | 3/2023 | Giri | G06F 9/4401 |
| | | | 714/15 |

* cited by examiner

*Primary Examiner* — Michael Maskulinski
(74) *Attorney, Agent, or Firm* — TROUTMAN PEPPER LOCKE LLP; Tim Tingkang Xia, Esq.

(57) ABSTRACT

In an aspect of the disclosure, a method, a computer-readable medium, and an apparatus are provided. The apparatus is a BMC. The BMC detects a boot failure from both an active firmware image and a recovery firmware image. The BMC starts a recovery protocol to acquire a fallback firmware image from a first source once it identifies the failure. The BMC flashes the obtained fallback firmware image onto its storage device. The BMC initiates a boot process using the fallback firmware image.

16 Claims, 6 Drawing Sheets

AUTOMATIC BMC AND BIOS FIRMWARE RECOVERY

BACKGROUND

Field

The present disclosure relates generally to computer systems, and more particularly, to techniques of initiating a recovery protocol to secure a fallback firmware image when a failure to boot a baseboard management controller (BMC) or a host computer is identified.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI. Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

Not all host systems have the hardware capability for service processors to access storages of component devices (e.g., a Serial Peripheral Interface (SPI) storages) directly or communicate with the component devices. Therefore, there is a need for a mechanism for updating firmware of the component devices conveniently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is a BMC. The apparatus is a BMC. The BMC detects a boot failure from both an active firmware image and a recovery firmware image. The BMC starts a recovery protocol to acquire a fallback firmware image from a first source once it identifies the failure. The BMC flashes the obtained fallback firmware image onto its storage device. The BMC initiates a boot process using the fallback firmware image.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
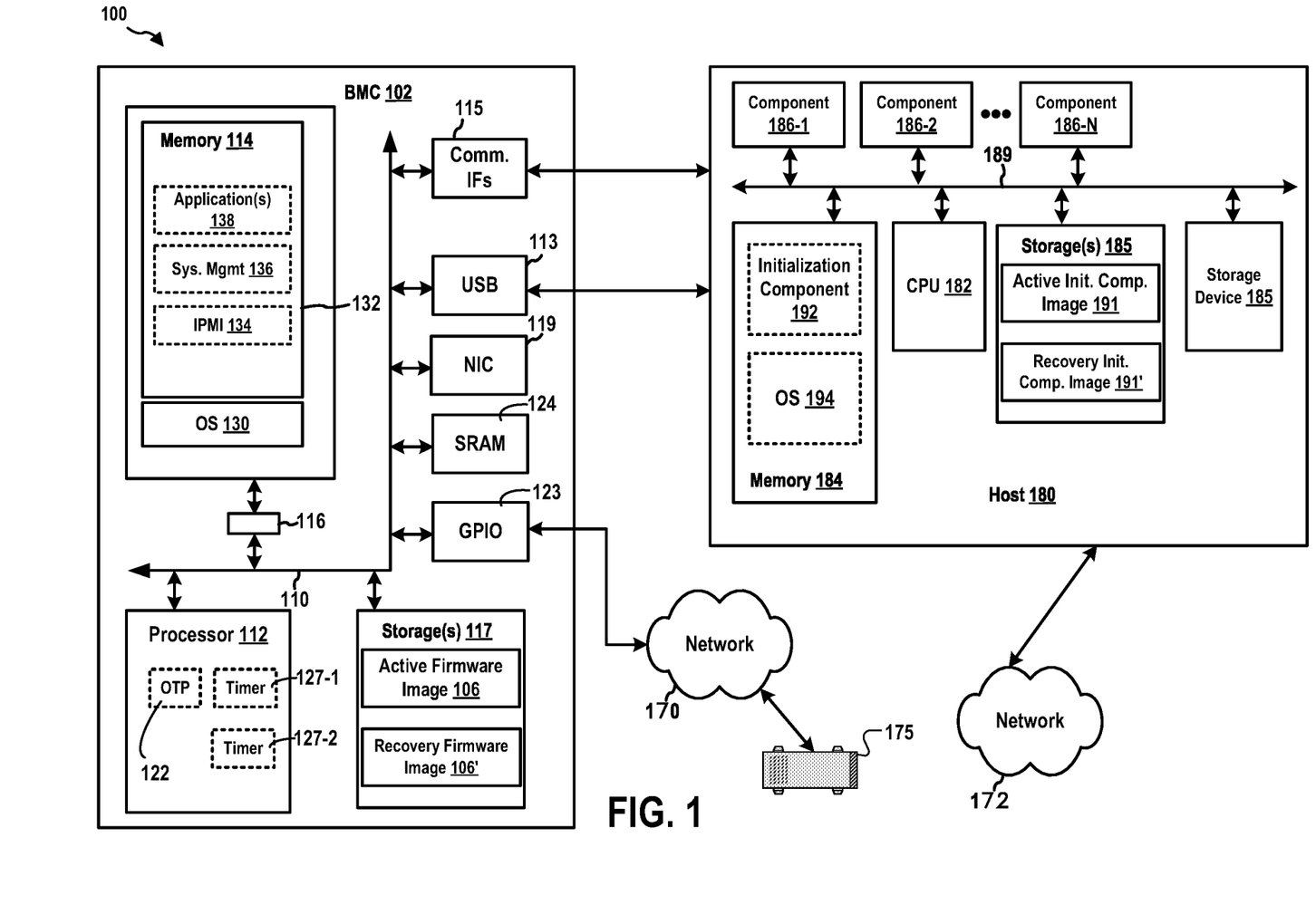
FIG. 1 is a diagram illustrating a computer system.

FIG. 1 is a diagram illustrating a computer system 100. In this example, the computer system includes, among other devices, a baseboard management controller (BMC) 102 and a host computer 180. The BMC 102 has, among other components, a processing unit 112, a memory 114(e.g., a dynamic random access memory(DRAM)), a memory driver 116, storage(s) 117, a network interface card 119, a USB interface 113(i.e., Universal Serial Bus), other communication interfaces 115, a SRAM 124(i.e., static RAM), and a GPIO interface 123(i.e., general purpose input/output interface). Further, the processing unit 112 contains an OTP memory 122 (i.e., one time programmable memory). The processing unit 112 also may contain one or more hardware timers such as a timer 127-1 and a timer 127-2. The functionalities of the timers 127-1, 127-2 are provided by the hardware components of the processing unit 112, rather than based on software programming.

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage(s) 117, the network interface card 119, the USB interface 113, and/or the communication interfaces 115 may be on the same chip. In addition, the memory 114, the processing unit 112, the memory driver 116, the storage(s) 117, the communication interfaces 115, and/or the network interface card 119 may be in communication with each other through a communication channel 110 such as a bus architecture.

The BMC 102 may store active BMC firmware image 106 in the storage(s) 117. The storage(s) 117 may utilize one or more non-volatile, non-transitory storage media. During a boot-up, the processing unit 112 loads code and data of the active BMC firmware image 106 into the memory 114. In particular, the active BMC firmware image 106 can provide in the memory 114 an BMC OS 130 (i.e., operating system) and service components 132. The service components 132 include, among other components, IPMI services 134, a system management component 136, and application(s) 138. Further, the service components 132 may be implemented as a service stack. As such, the active BMC firmware image 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 602 shown in FIG. 6.

After the host computer 180 is powered on, the host CPU 182 loads an initialization component 192 from the storage device(s) 185 into the host memory 184 and executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170(e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
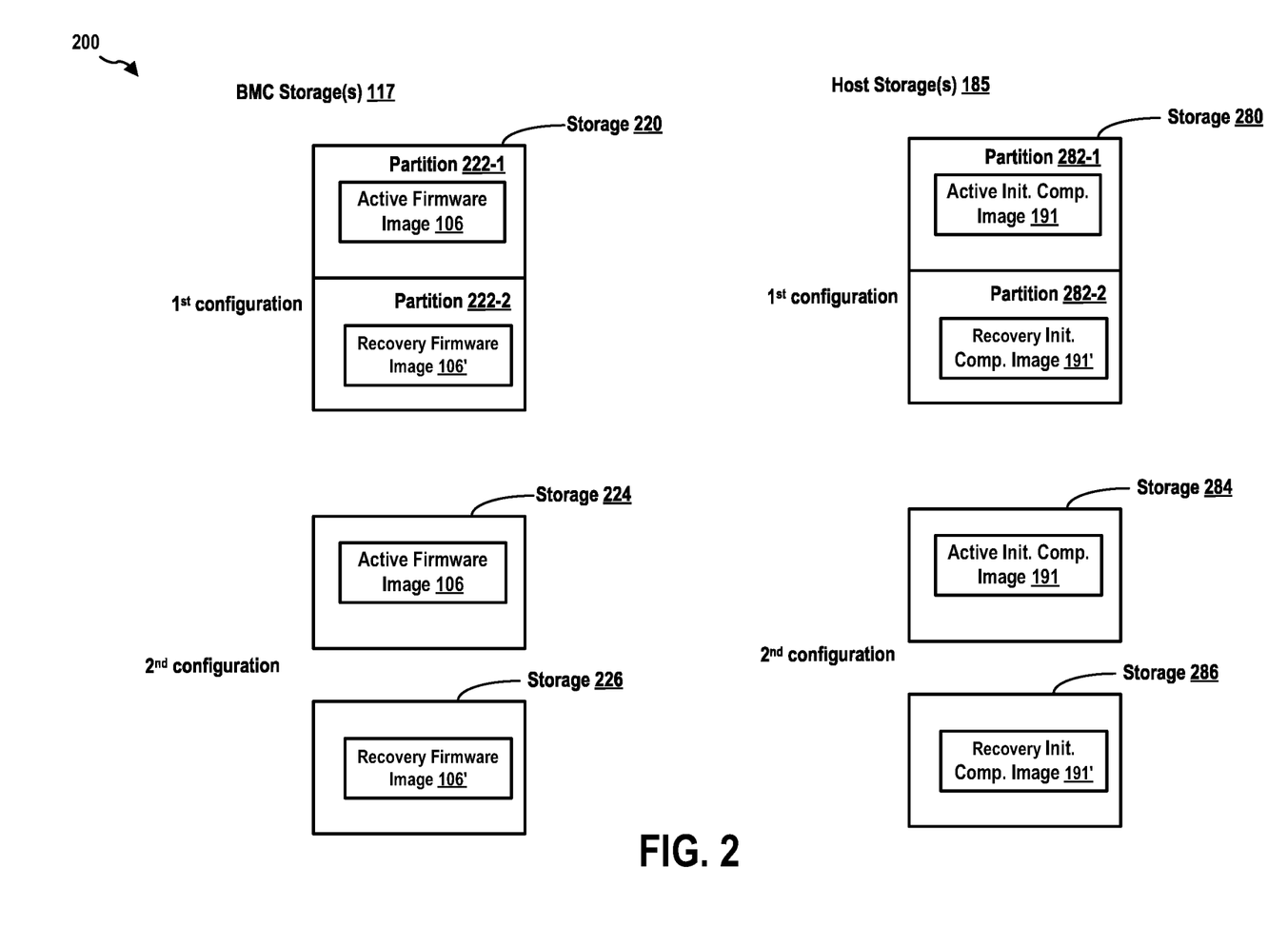
FIG. 2 is a diagram illustrating configurations of storage devices at a BMC and a host computer.

FIG. 2 is a diagram 200 illustrating configurations of storage devices at the BMC 102 and the host computer 180. In a first configuration of the BMC 102, the active BMC firmware image 106 and the recovery BMC firmware 106' are stored in a single storage device 220(e.g., a serial peripheral interface (SPI) flash storage) of the storage(s) 117. For example, the storage device 220 may have a partition 222-1, which stores the active BMC firmware image 106, and a partition 222-2, which stores the recovery BMC firmware 106'. In a second configuration, the storage(s) 117 includes two separate storage devices (e.g., SPI flash storage): a storage device 224, which stores the active BMC firmware image 106, and a storage device 226, which stores the recovery BMC firmware 106'.

Similarly, in a first configuration of the host computer 180, the active initialization component image 191 and the recovery initialization component image 191' are stored in a single storage device 280 (e.g., a SPI flash storage) of the storage device(s) 185. For example, the storage device 280 may have a partition 282-1, which stores the active initialization component image 191, and a partition 282-2, which stores the recovery initialization component image 191'. In a second configuration, the storage device(s) 185 includes two separate storage devices (e.g., SPI flash storage): a storage device 284, which stores the active initialization component image 191, and a storage device 286, which stores the recovery initialization component image 191'.

Figure 3:
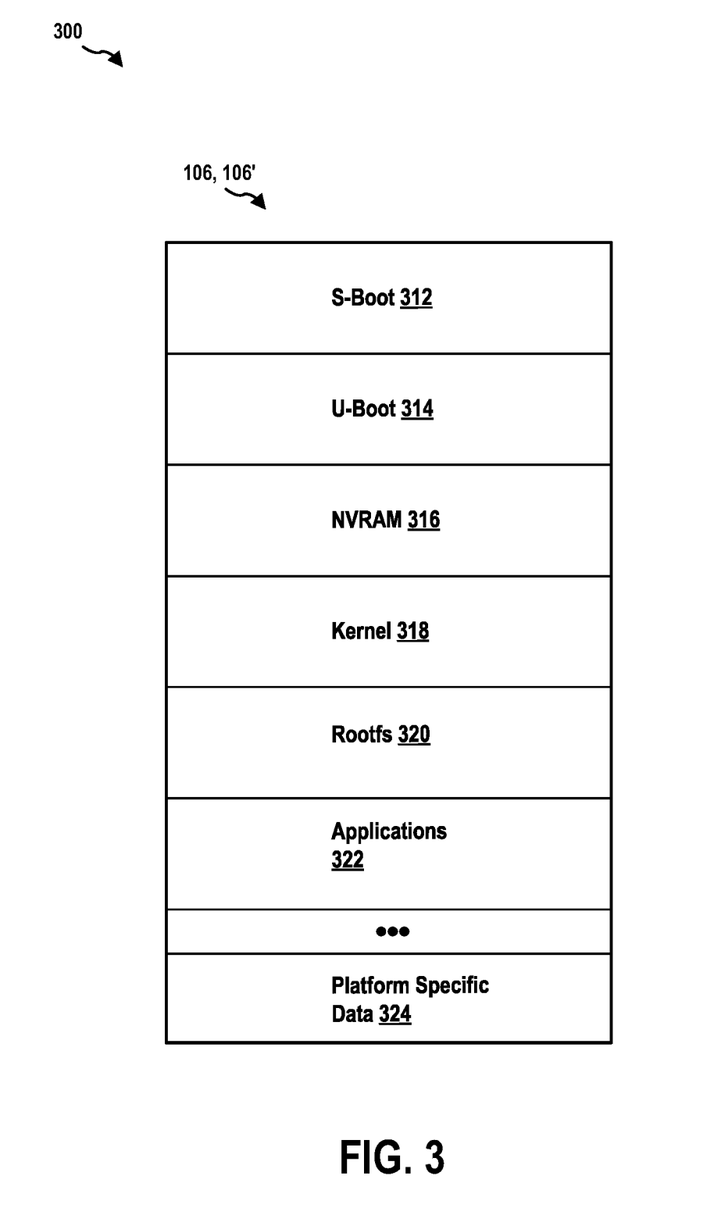
FIG. 3 is a diagram illustrating data sections of an active BMC firmware image or a recovery BMC firmware 106'.

FIG. 3 is a diagram 300 illustrating data sections of an active BMC firmware image 106 or a recovery BMC firmware 106'. Each of the active BMC firmware image 106 and the recovery BMC firmware 106' contains data sections of an S-Boot 312 (i.e., a first boot program), a U-Boot 314 (i.e., a second boot program), a NVRAM 316 (i.e., non-volatile random-access memory), a kernel 318, a rootfs 320 (i.e., root file system), applications 322, and platform specific data 324.

Figure 4:
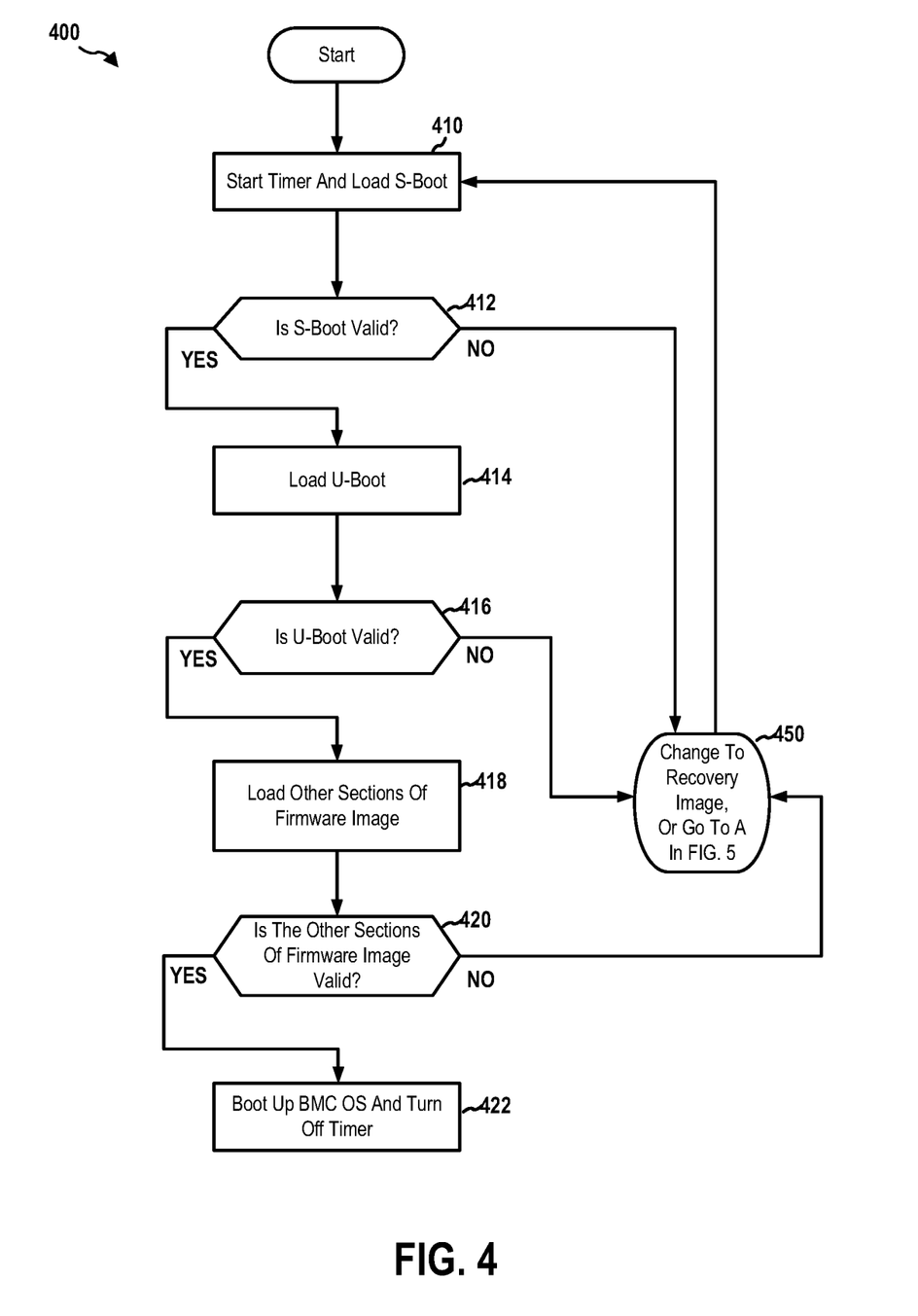
FIG. 4 is a diagram illustrating validation procedures utilized in a bootup process of the BMC.

FIG. 4 is a diagram 400 illustrating validation procedures utilized in a bootup process of the BMC 102. After the BMC 102 is powered on or reset, the BMC 102 enters a booting process.

In initially, the processing unit 112 use the active BMC firmware image 106 stored in the storage(s) 117 as an input and loads data sections in the procedures described infra. In procedure 410, the processing unit 112 configures the timer 127-1 to expire at a first time period and starts the timer 127-1. The first time period is longer than a time period needed to boot up the BMC 102. For example, assuming the booting process needs 30 seconds to complete, the first time period may be 45 seconds. Further, the processing unit 112 loads, from the storage(s) 117, the data section of the active BMC firmware image 106 containing the S-Boot 312(e.g., the initial 64 KB) into the SRAM 124. The data of this section are encrypted with the private key A of a first public key/private key pair.

In procedure 412, the processing unit 112 validates the data section of the S-Boot 312. In particular, the OTP memory 122 of the processing unit 112 is programmed with the public key A of the first public key/private key pair. The processing unit 112 retrieves the public key A from the OTP memory 122, and uses the public key A to decrypt the data section of the S-Boot 312. As such, the decrypted data of the S-Boot 312 are stored in the SRAM 124. Further, in certain configurations, the processing unit 112 may calculate a Hash for the decrypted data of the S-Boot 312 and extract another Hash stored in the decrypted data. The processing unit 112 then compares the calculated Hash and the stored Hash to determine if the S-Boot 312 is valid.

When the data section containing the S-Boot 312 is not valid, the processing unit 112 enters procedure 450. When data of the S-Boot 312 is valid, the processing unit 112 executes the S-Boot 312. The S-Boot 312 initializes the memory 114(e.g., a DRAM). Subsequently, in procedure 414, the S-Boot 312 loads the data section of the active BMC firmware image 106 containing the U-Boot 314 into the memory 114. In procedure 416, the S-Boot 312 then validates the data of the U-Boot 314. For example, similar to what was described supra, the processing unit 112 may use Hashes to validate the data section containing the U-Boot 314.

When the data section containing the U-Boot 314 is not valid, the S-Boot 312 enters procedure 450, in which the booting process is ended. When data section containing the U-Boot 314 is valid, the S-Boot 312 passes control to the U-Boot 314. That is, the processing unit 112 executes the U-Boot 314 and enters procedure 418.

In procedure 418, the U-Boot 314 then loads the remainder of the active BMC firmware image 106 (e.g., data sections of the NVRAM 316, the kernel 318, the rootfs 320, the applications 322, the platform specific data 324, etc.) into the memory 114. In certain configurations, the data sections of the kernel 318, the rootfs 320, the applications 322, and/or other components are encrypted by the private key B of a second public key/private key pair. Further, the platform specific data 324 contain the public key B of the second public key/private key pair.

In procedure 420, the U-Boot 314 validates those data sections of the active BMC firmware image 106. In particular, the U-Boot 314 retrieves the public key B from the platform specific data 324 and uses the public key B to decrypt the data sections containing the kernel 318, the rootfs 320, the applications 322, etc. Further, similar to what was described supra, the processing unit 112 may use Hashes to validate the data containing those components.

When the data sections of the kernel 318, the rootfs 320, the applications 322, and/or other components are not valid, the U-Boot 314 enters procedure 450. When those sections are valid, in procedure 422, the BMC OS 130 is booted up. In particular, the U-Boot 314 passes the control to the kernel 318. The kernel 318 then initializes the rootfs 320. The kernel 318 then mounts the NVRAM 316 (e.g., utilizing the SRAM 124). The NVRAM 316 may contain system configuration information, such as settings for the hardware and the BMC firmware. The applications 322 (e.g., the IPMI services 134, the system management component 136, and the application(s) 138) are then started.

In procedure 450, where the booting process using the active BMC firmware image 106 has failed, the processing unit 112 changes the image to be used in the booting process to the recovery BMC firmware 106', and enters in procedure 410 with the recovery BMC firmware 106' as an input. Further, the BMC OS 130 stops the timer 127-1.

When executing the procedures described supra with the recovery BMC firmware 106' (instead of the active BMC firmware image 106), in places where the processing unit 112 enters procedure 450 previously, the processing unit 112 enters procedure 510. In particular, when the timer is not stopped and expires (i.e., the booting process has failed), the BMC 102 resets. After reset, if the prior booting process is executed with the active BMC firmware image 106, the processing unit 112 enters procedure 450. If the prior booting process is executed with the recovery BMC firmware 106', the process enters procedure 510.

Figure 5:
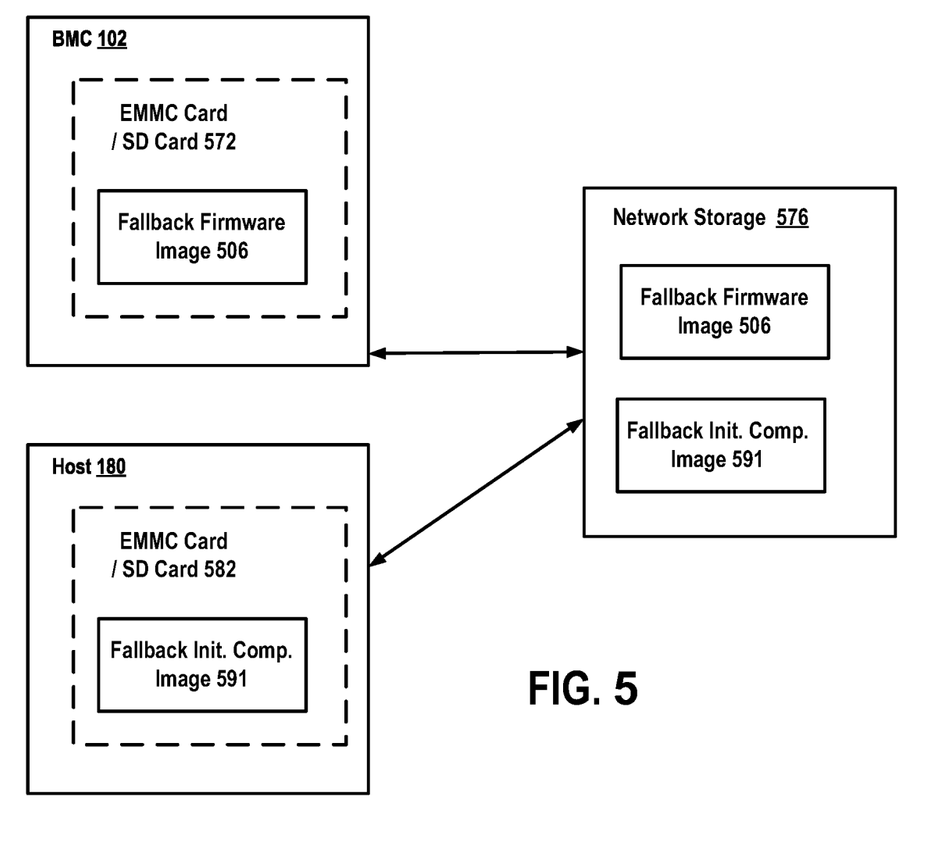
FIG. 5 is a diagram illustrating a fallback booting protocol.

FIG. 5 is a diagram 500 illustrating a fallback booting protocol. As described supra, the processing unit 112 may enter procedure 510 after the processing unit 112 has failed to boot from the recovery BMC firmware 106' as described supra in FIG. 4. In procedure 510, the processing unit 112 engages a process to recover a fallback firmware 506 from an alternative source. The processing unit 112 is programmed to detect a failure to boot from both the primary firmware source (active BMC firmware image 106) and the secondary firmware source (recovery BMC firmware 106'). In particular, referring to FIG. 4, when the processing unit 112 is booting from the recovery BMC firmware 106' and the timer 127-1 expires, the BMC 102 resets. After the BMC 102 restarts, when the processing unit 112 detects (e.g., through an indicator stored in the storage(s) 117) the failure to boot from the recovery BMC firmware 106', the processing unit 112 initiates a recovery protocol to secure a valid firmware image from one of the sources described infra.

In certain configurations, the BMC 102 is equipped with an Embedded MultiMedia Card (eMMC card) or Secure Digital (SD) card such as an eMMC card and/or SD card 572, which may be a first source that can provide the fallback firmware 506 as the fallback firmware 506 may be stored on the eMMC card and/or SD card 572. The eMMC card and/or SD card 572 provides a means to recover the BMC boot process in the event that both the active BMC firmware image 106 and the recovery BMC firmware 106' (on the storage device 220 or storage device 220 or storage devices 224, 226) are corrupted.

Not all platform designs may contain an eMMC card and/or SD card 572. Cost considerations may lead some system designs to omit this component. In certain configurations, for systems without an SD card or an eMMC card, a network storage 576 may be a second source that can provide the fallback firmware 506. The processing unit 112 can retrieve a copy of the BMC firmware via a remote file transfer protocol such as TFTP, SFTP, or HTTPS from the network storage 576.

As such, the processing unit 112 may retrieve the fallback firmware 506 from one of the sources described supra. Further, the processing unit 112 flashes the fallback firmware 506 onto the storage device 220 or storage devices 224, 226.

In procedure 512, the processing unit 112 determines whether the firmware recovery process from the selected source is successful. In particular, the processing unit 112 determines whether the fallback firmware 506 has been successfully retrieved and flashed onto the storage device 220 or storage devices 224, 226. When the firmware recovery is not successful, the processing unit 112 enters the procedure 510 to recover the firmware from a different source, if there is one; otherwise, the processing unit 112 ends the booting process.

When the BMC OS 130 (either loaded from the active BMC firmware image 106 or recovery BMC firmware 106') has been successfully booted, the processing unit 112, under the instructions of one of the application(s) 138, may validate the active initialization component image 191 (e.g., BIOS) stored on the storage device(s) 185. Similarly to what was described supra, the data of the active initialization component image 191 may be encrypted by the private key A of the first public key/private key pair. Accordingly, the processing unit 112 retrieves the public key A from the OTP memory 122 and uses the public key A to decrypt the data. The processing unit 112 may further uses Hashes to validate the data of the active initialization component image 191.

When the data of the active initialization component image 191 are valid, the BMC 102 starts the timer 127-2 and the booting process of the host computer 180 with the active initialization component image 191 as an input. Accordingly, the host CPU 182 loads the active initialization component image 191 and executes the initialization component 192 from that image. Subsequently, the initialization component 192 initiates the booting process of the host computer 180. Further, the timer 127-2 is configured to expire after a second time period. The second time period is longer than a time period needed to boot up the host computer 180. For example, assuming the booting process needs 2 minutes to complete, the second time period may be 3 minutes.

When the data of the active initialization component image 191 are not valid, the BMC 102 does not use the active initialization component image 191 and, in turn, validates the data of the recovery initialization component image 191' stored on the storage device(s) 185. Similarly, the data of the recovery initialization component image 191' may be encrypted with the private key A. The processing unit 112 may use the first public key and Hashes to validate the data of the recovery initialization component image 191'.

When the data of the recovery initialization component image 191' are valid, the BMC 102 starts the timer 127-2 and the booting process of the host computer 180 with the recovery initialization component image 191' as an input. Accordingly, the host CPU 182 loads the recovery initialization component image 191' and executes the initialization component 192 from that image. Subsequently, the initialization component 192 from the recovery initialization component image 191' initiates the booting process of the host computer 180. When the data of the recovery initialization component image 191' are not valid, the booting process of the host computer 180 terminates.

After the OS 194 has been successfully booted (either by the initialization component 192 from the active initialization component image 191 or the recovery initialization component image 191'), an application of the host computer 180 may set a corresponding GPIO value at the BMC 102 through the GPIO interface 123. For example, the corresponding GPIO value at default may be low, and the host computer 180 may set the value to high through the GPIO interface 123. When the corresponding GPIO value is set by the host computer 180, the processing unit 112, accordingly, turns off the timer 127-2.

When the timer is not stopped by the application of host computer 180 and expires (i.e., the booting process has failed), the processing unit 112 resets/restarts the host computer 180. If the prior booting process of the host computer 180 is initiated by the initialization component 192 from the active initialization component image 191, the BMC 102 resets the booting process of the host computer 180 with the recovery initialization component image 191'. Subsequently, the BMC 102 validates the recovery initialization component image 191' as described supra and directs the host CPU 182 to executes the initialization component 192 from the recovery initialization component image 191' that has been validated. If the prior booting process of the host computer 180 is initiated by the initialization component 192 from the recovery initialization component image 191', the processing unit 112 may use the fallback booting process described supra referring to FIG. 5 to retrieve a fallback initialization component image 591.

In certain configurations, the host computer 180 is equipped with an eMMC card and/or SD card 582, which may be a first source that can provide the fallback initialization component image 591 as the fallback initialization component image 591 may be stored on the eMMC card and/or SD card 582. The eMMC card and/or SD card 582 provides a means to recover the host boot process in the event that both the active initialization component image 191 and the recovery initialization component image 191' (on the storage device(s) 185) are corrupted.

In certain configurations, a network storage 576 may be a second source that can provide the fallback initialization component image 591. The processing unit 112 can retrieve a copy of the fallback initialization component image 591 via a remote file transfer protocol such as TFTP, SFTP, or HTTPS from the network storage 576.

As such, the processing unit 112 may retrieve the fallback initialization component image 591 from one of the sources described supra. For example, if the active and recovery BIOS images fail to boot on the host computer 180, the BMC can obtain a fallback BIOS image from another source (e.g., the eMMC card and/or SD card 582 or the network storage 576). This fallback BIOS image can then be flashed onto the active and recovery partitions of the SPI flash storage (e.g., a component of the storage device(s) 185) on the host.

Hence, the techniques disclosed here provide automatic recovery measures, ensuring system continuity even in the event of both active and recovery BMC firmware or BIOS image corruptions. This not only strengthens the reliability of the computer system but also reduces system downtime and maintenance costs.

Figure 6:
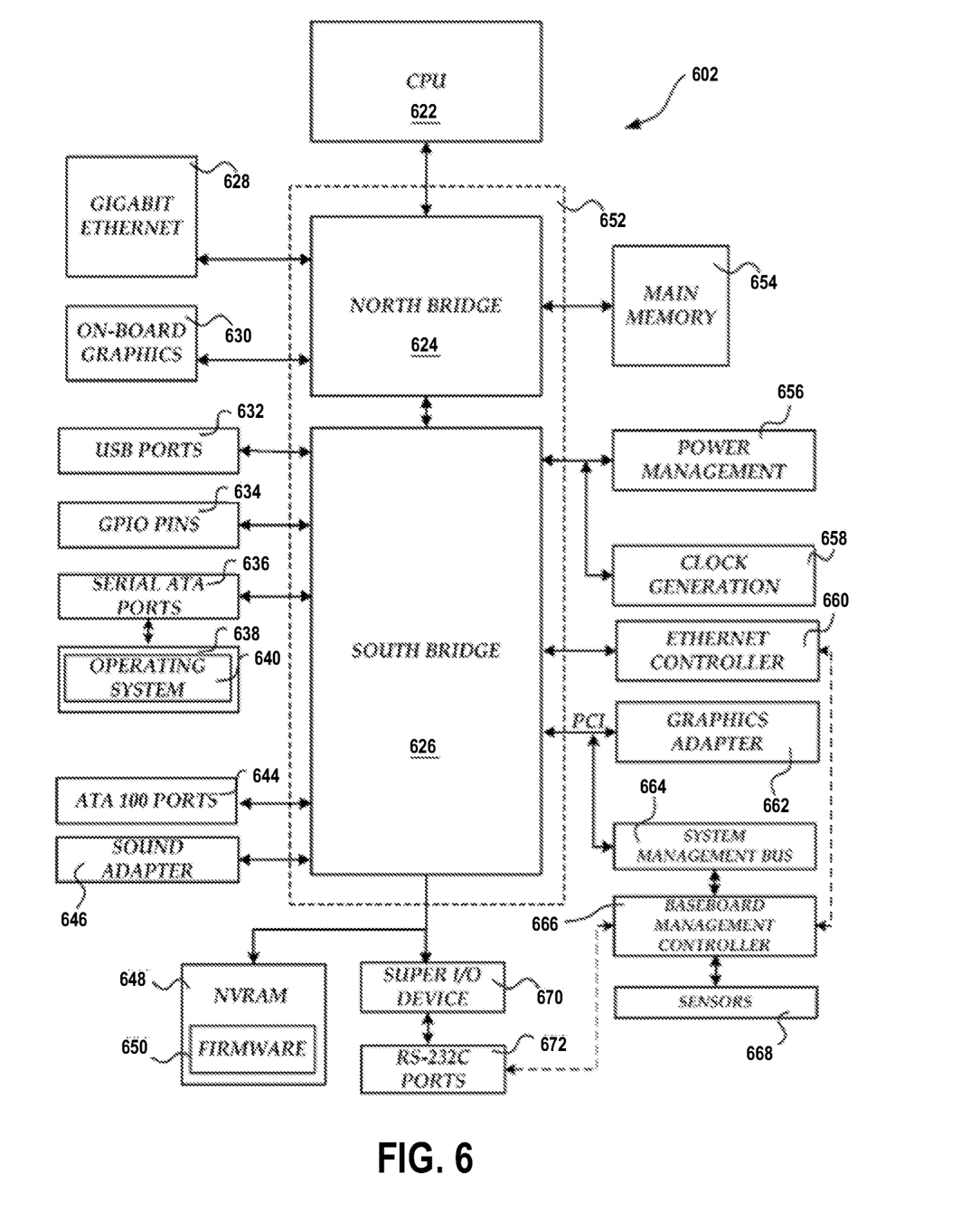
FIG. 6 shows an architecture for a computer.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the host computer 180, as described supra. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 602 shown in FIG. 6 includes a baseboard, or "motherboard," which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more USB ports 632, a sound adapter 646, an Ethernet controller 660, and one or more GPIO pins 634. The south bridge 626 may also provide a bus for interfacing peripheral card devices such as a graphics adapter 662. In one embodiment, the bus comprises a PCI bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention the operating system 640 comprises an operating system within the WINDOWS family of operating systems from MICROSOFT CORPORATION. According to another embodiment, the operating system 640 comprises the UNIX, LINUX, or SOLARIS operating system. It should be appreciated that other operating systems may also be utilized.

The mass storage devices connected to the south bridge 626, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. The BMC 666 may be the BMC 102. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should also be appreciated that the computer 602 may comprise other types of computing devices, including hand-held computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for recovering a firmware image in a baseboard management controller (BMC), the method comprising:
identifying, by the BMC, a failure to boot the BMC from both an active firmware image and a recovery firmware image;
initiating a recovery protocol to secure a fallback firmware image from a first source, when the failure is identified;
flashing the fallback firmware image onto a storage device of the BMC;
booting the BMC using the fallback firmware image stored on the storage device;
identifying, by the BMC, a failure to boot a host computer managed by the BMC from both an active initialization component image and a recovery initialization component image;
initiating a recovery protocol to secure a fallback initialization component image from a source when the failure is identified;
flashing the fallback initialization component image onto a storage device of the host computer;
booting the host computer using the fallback initialization component image stored on the storage device; and
initiating a recovery protocol to secure the fallback initialization component image from a second source, when the recovery from the first source is unsuccessful.

2. The method of claim 1, further comprising:
validating the fallback firmware image after it is flashed onto the storage device; and
prevent the BMC from booting the fallback firmware image, when the validation is unsuccessful.

3. The method of claim 1, wherein the first source comprises at least one of an Embedded MultiMedia Card (eMMC), a Secure Digital (SD) card, and network storage.

4. The method of claim 3, wherein the first source is the network storage and the fallback firmware image is retrieved via a remote file transfer protocol selected from a group consisting of Trivial File Transfer Protocol (TFTP), Secure File Transfer Protocol (SFTP), or Hypertext Transfer Protocol Secure (HTTPS).

5. The method of claim 1, further comprising:
initiating a recovery protocol to secure the fallback firmware image from a second source, when the recovery from the first source is unsuccessful.

6. The method of claim 1, wherein the source comprises at least one of an Embedded MultiMedia Card (eMMC), a Secure Digital (SD) card, and network storage connected to the host computer.

7. The method of claim 1, wherein the active initialization component image and the recovery initialization component image are basic input/output system (BIOS) images or Unified Extensible Firmware Interface (UEFI) images.

8. The method of claim 1, further comprising:
validating the fallback initialization component image after it is flashed onto the storage device of the host computer; and
prohibiting the host computer from booting the fallback initialization component image, when the validation is unsuccessful.

9. An apparatus, the apparatus being a baseboard management controller (BMC), comprising:
a memory; and
at least one processor coupled to the memory, the processor configured to:
identify a failure to boot the apparatus from both an active firmware image and a recovery firmware image
initiate a recovery protocol to secure a fallback firmware image from a first source, when the failure is identified;
flash the fallback firmware image onto a storage device of the apparatus;
boot the apparatus using the fallback firmware image stored on the storage device;
identify a failure to boot a host computer from both an active initialization component image and a recovery initialization component image;
initiate a recovery protocol to secure a fallback initialization component image from a source, when the failure is identified;
flash the fallback initialization component image onto a storage device of the host computer;
boot the host computer using the fallback initialization component image stored on the storage device; and
initiate a recovery protocol to secure the fallback initialization component image from a second source, when the recovery from the first source is unsuccessful.

10. The apparatus of claim 9, wherein the processor is further configured to:
validate the fallback firmware image after it is flashed onto the storage device; and
prevent the apparatus from booting the fallback firmware image, when validation is unsuccessful.

11. The apparatus of claim 9, wherein the first source comprises at least one of an Embedded MultiMedia Card (eMMC), a Secure Digital (SD) card, and network storage.

12. The apparatus of claim 11, wherein the first source is the network storage, and wherein the fallback firmware image is retrieved via a remote file transfer protocol selected from a group consisting of Trivial File Transfer Protocol (TFTP), Secure File Transfer Protocol (SFTP), or Hypertext Transfer Protocol Secure (HTTPS).

13. The apparatus of claim 9, wherein the processor is further configured to:
initiate a recovery protocol to secure the fallback firmware image from a second source, when the recovery from the first source is unsuccessful.

14. The apparatus of claim 9, wherein the source comprises at least one of an Embedded MultiMedia Card (eMMC), a Secure Digital (SD) card, and network storage connected to the host computer.

15. The apparatus of claim 9, wherein the active initialization component image and the recovery initialization component image are basic input/output system (BIOS) images or Unified Extensible Firmware Interface (UEFI) images.

16. The apparatus of claim 9, wherein the processor is further configured to:
validate the fallback initialization component image after it is flashed onto the storage device of the host computer; and prevent the host computer from booting the fallback initialization component image, when the validation is unsuccessful.

\* \* \* \* \*